(12) United States Patent
Harada et al.

(10) Patent No.: US 9,074,077 B2
(45) Date of Patent: Jul. 7, 2015

(54) MODIFIED CELLULOSE NANOFIBERS, PRODUCTION METHOD THEREOF, AND RESIN COMPOSITION USING SAME

(75) Inventors: Tetsuya Harada, Sakura (JP); Satoshi Katano, Chiba (JP); Akihiro Sato, Chiba (JP); Kazuya Miyamoto, Ichihara (JP)

(73) Assignees: DIC Corporation, Tokyo (JP); Seiko PMC Corporation, Tokyo (JP)

( * ) Notice: Subject to any disclaimer, the term of this patent is extended or adjusted under 35 U.S.C. 154(b) by 7 days.

(21) Appl. No.: 14/004,008

(22) PCT Filed: Mar. 12, 2012

(86) PCT No.: PCT/JP2012/056264
§ 371 (c)(1),
(2), (4) Date: Sep. 9, 2013

(87) PCT Pub. No.: WO2012/124652
PCT Pub. Date: Sep. 20, 2012

(65) Prior Publication Data
US 2013/0345341 A1    Dec. 26, 2013

(30) Foreign Application Priority Data
Mar. 11, 2011   (JP) .................................. 2011-054442

(51) Int. Cl.
| | | |
|---|---|---|
| *C08L 1/02* | (2006.01) | |
| *C08L 33/10* | (2006.01) | |
| *B82Y 30/00* | (2011.01) | |
| *C08J 5/00* | (2006.01) | |
| *C08J 5/04* | (2006.01) | |
| *D06M 13/203* | (2006.01) | |
| *D06M 15/00* | (2006.01) | |
| *C08L 1/28* | (2006.01) | |
| *C08B 11/14* | (2006.01) | |
| *D06M 13/11* | (2006.01) | |
| *D06M 13/46* | (2006.01) | |
| *C08B 11/20* | (2006.01) | |
| *D06M 101/06* | (2006.01) | |

(52) U.S. Cl.
CPC . *C08L 1/02* (2013.01); *B82Y 30/00* (2013.01); *C08J 5/005* (2013.01); *C08J 5/045* (2013.01); *D06M 13/203* (2013.01); *D06M 15/00* (2013.01); *D06M 2101/06* (2013.01); *C08L 1/288* (2013.01); *C08L 2205/16* (2013.01); *C08L 2205/18* (2013.01); *C08B 11/14* (2013.01); *D06M 13/11* (2013.01); *D06M 13/46* (2013.01); *C08B 11/20* (2013.01)

(58) Field of Classification Search
USPC ............................................ 524/35; 428/401
See application file for complete search history.

(56) References Cited

U.S. PATENT DOCUMENTS

| | | | |
|---|---|---|---|
| 5,382,610 A | * | 1/1995 | Harada et al. ................... 524/35 |
| 2012/0328877 A1 | * | 12/2012 | Shiramizu et al. ............. 428/401 |
| 2013/0005869 A1 | * | 1/2013 | Yano et al. ...................... 524/43 |

FOREIGN PATENT DOCUMENTS

| | | | |
|---|---|---|---|
| CA | 2549844 A1 | | 11/2007 |
| EP | 0859011 A1 | | 8/1998 |
| JP | 2005-023281 | * | 1/2005 |
| JP | 2005-023281 A | | 1/2005 |
| JP | 2005-042283 A | | 2/2005 |
| JP | 2006-241450 A | | 9/2006 |
| JP | 2009-209376 | * | 9/2009 |
| JP | 2009-209376 A | | 9/2009 |
| JP | 2010-168336 A | | 8/2010 |
| WO | WO-01/66600 A1 | | 9/2001 |
| WO | WO-01/66600 A1 | * | 9/2001 |
| WO | WO-02/083743 A1 | | 10/2002 |
| WO | WO-2011/096529 A1 | | 8/2011 |
| WO | WO-2012/124652 A1 | * | 9/2012 |

OTHER PUBLICATIONS

Cai, X. et al., "Cellulose fiber/poly(ethylene-co-methacrylic acid) composites with ionic interphase," Composites: Part A, (2003), vol. 34, pp. 1075-1084.*
Cai, X. et al., "Cellulose fiber/poly(ethylene-co-methacrylic acid) composites with ionic interphase," Composites: Part A, 2003, vol. 34, pp. 1075-1084.
International Search Report dated Apr. 17, 2012, issued for PCT/JP2012/056264.
Extended European Search Report issued in corresponding European Patent Application No. 12757598.3, dated Jul. 3, 2014.

* cited by examiner

*Primary Examiner* — Peter D Mulcahy
*Assistant Examiner* — Henry Hu
(74) *Attorney, Agent, or Firm* — Locke Lord LLP; James E. Armstrong, IV; Nicholas J. DiCeglie, Jr.

(57) ABSTRACT

The present invention relates to modified cellulose nanofibers obtained by neutralizing cationic groups of cationic cellulose nanofibers with an anionic additives. Moreover, the present invention relates to a resin composition containing the aforementioned modified cellulose nanofibers and a molding resin, and to a molded body obtained by molding the resin composition. Furthermore, the present invention relates to a production method of modified cellulose nanofibers comprising neutralizing cationic groups of cationic cellulose nanofibers with an anionic additives.

5 Claims, No Drawings

US 9,074,077 B2

MODIFIED CELLULOSE NANOFIBERS, PRODUCTION METHOD THEREOF, AND RESIN COMPOSITION USING SAME

TECHNICAL FIELD

The present invention relates to modified cellulose nanofibers obtained by neutralizing cationic cellulose with an anionic additive, a production method thereof, a resin composition comprising the modified cellulose nanofibers, and a molded body thereof.

BACKGROUND ART

Plant fibers containing cellulose such as hemp, cotton, jute, wood pulp or bamboo have long been used as naturally-derived, renewable raw materials in various applications such as paper, clothing and packaging materials. Cellulose is a polysaccharide that does not normally exist in molecular form, but rather adopts a multilayer structure in the form of cellulose microfibrils consisting of aggregates of cellulose molecules, microfibril bundles consisting of aggregates of cellulose microfibrils, and aggregates thereof.

In recent years, a technology has been developed for obtaining cellulose nanofibers by fibrillating plant fibers containing cellulose to the nanometer level by subjecting to mechanical and/or chemical treatment, and these cellulose nanofibers are attracting attention as resin composite materials having low specific gravity and high strength (see Patent Document 1).

Since cellulose nanofibers per se are extremely highly hydrophilic as a result of containing a large number of hydroxyl groups, they are normally obtained by subjecting plant fibers containing cellulose to mechanical treatment in an aqueous medium. However, since cellulose nanofibers obtained after fibrillating to the nanometer level in water are highly hydrophilic and a network is formed by the cellulose nanofibers, the viscosity and water retention of the resulting slurry become extremely high. Consequently, there was the problem of requiring an extremely long drainage time when dehydrating by filtration and the like an aqueous dispersion of cellulose nanofibers.

In addition, even after having taken the time to obtain cellulose nanofibers by draining, if the resulting cellulose nanofibers end up drying, they end up aggregating due to hydrogen bonding between the nanofibers, thereby resulting in the problem of it being difficult to uniformly re-disperse despite having comparatively superior dispersibility in water. Consequently, it is even more difficult to form a composite of highly hydrophilic cellulose nanofibers in highly hydrophobic resins. For example, although a method is known for compounding cellulose nanofibers and resin by dehydrating sheet-like cellulose nanofibers by solvent displacement and the like prior to drying followed by impregnating in the resin (see Patent Document 2), in this method, since the cellulose nanofibers in the resin are limited to those in the form of a sheet, it was difficult to uniformly disperse the nanofibers in the resin.

PRIOR ART DOCUMENTS

Patent Documents

[Patent Document 1] Japanese Unexamined Patent Application, First Publication No. 2005-42283
[Patent Document 2] Japanese Unexamined Patent Application, First Publication No. 2006-241450
[Patent Document 3] Japanese Unexamined Patent Application, First Publication No. 2010-168336

DISCLOSURE OF THE INVENTION

Problems to be Solved by the Invention

An object of the present invention is to provide modified cellulose nanofibers having a short drainage time when recovering cellulose nanofibers, and a resin composition containing the modified cellulose nanofibers that has high strength and enables the cellulose nanofibers to be uniformly dispersed in the resin following their recovery.

Means for Solving the Problems

The inventors of the present invention found that the aforementioned problems can be solved by neutralizing cationic cellulose nanofibers with an anionic additive. As a result of this neutralization, it was found that drainage time when recovering the cellulose nanofibers from an aqueous medium is shortened, the resulting cellulose nanofibers can be uniformly dispersed in a molding resin, and the strength of the resulting resin is further increased.

Namely, the present invention relates to modified cellulose nanofibers obtained by neutralizing cationic groups of cationic cellulose nanofibers with an anionic additive.

Moreover, the present invention relates to a resin composition comprising the aforementioned modified cellulose nanofibers and a molding resin, and to a molded body obtained by molding the resin composition.

Furthermore, the present invention relates to a production method of modified cellulose nanofibers comprising neutralizing cationic groups of cationic cellulose nanofibers with an anionic additive.

Effects of the Invention

According to the present invention, modified cellulose nanofibers for which drainage time during recovery of the cellulose nanofibers is shortened considerably and which can be easily dispersed in a molding resin, a molding resin composition in which the modified cellulose nanofibers are uniformly dispersed, and a molded body of that composition, can be obtained.

BEST MODE FOR CARRYING OUT THE INVENTION

The following provides a detailed description of modes for carrying out the present invention.

[Cellulose Nanofibers]

Recently developed cellulose nanofibers are nanofibers that have been derived from natural raw materials, and are used as composite materials for resins having low specific gravity and high strength. In the production of cellulose nanofibers, cellulose nanofibers are typically produced by fibrillating or defibrating a material containing cellulose fibers by grinding and/or beating with a refiner, high-pressure homogenizer, agitated media mill, stone mortar, grinder or twin screw extruder and the like. Cellulose nanofibers can also be produced using a known method such as the method described in Japanese Unexamined Patent Application, First Publication No. 2005-42283. In addition, cellulose nanofibers can also be produced using microorganisms (such as *Acetobacter* species). Moreover, commercially available products can also be used. Although sources of cellulose fiber-containing materials are known to include plants (such as wood, bamboo, hemp, jute, kenaf, agricultural crop waste, cloth, pulp, recycled pulp or waste paper), animals (such as sea squirts), algae, microorganisms and microbial products, any of these sources can be used in the present invention. In addition, commercially available microfibrillated cellulose such as Celish (Daicel Chemical Industries Ltd.) may also be used.

The cellulose fiber-containing material preferably consists of cellulose fibers derived from a plant or microorganism, and more preferably consists of cellulose fibers derived from a plant, a commercially available example of which is KC Flock (NIPPON PAPER Chemicals Co., Ltd.).

In addition, cellulose nanofibers may be treated with an alkaline solution (such as aqueous alkaline metal hydroxide solution or aqueous ammonia). Moreover, cellulose nanofibers may also be obtained by treating a cellulose fiber-containing material with an alkaline solution after first putting into a form that facilitates efficient alkaline treatment as necessary using a refiner, ball mill or cutter mill and the like, and then grinding and/or beating the treated product using a known fibrillation or defibrating technology used in the production of cellulose nanofibers, typical examples of which include the use of a high-pressure homogenizer, agitated media mill, stone mortar or grinder.

The diameter of the cellulose nanofibers is, on average, preferably 4 nm to 800 nm, more preferably 4 nm to 400 nm, and even more preferably 4 nm to 100 nm. In addition, although cellulose nanofibers have an extremely long fiber length relative to fiber diameter and it is difficult to determine their fiber length, the average value thereof is preferably 5 or more times fiber diameter, more preferably 10 or more times fiber diameter, and even more preferably 20 or more times fiber diameter. In addition, if fiber length were ventured to be described, it would preferably be an average of 50 nm to 200 μm and more preferably 100 nm to 50 μm.

[Cationic Cellulose Nanofibers]

Cationic cellulose nanofibers refer to cellulose nanofibers into which cationic groups have been introduced. Cellulose is inherently weakly anionic, and cationic cellulose can be obtained by treating with a cationizing agent.

Cationic groups refer to cationic groups and groups capable of becoming cationic groups. Examples include quaternary ammonium salts, primary, secondary and tertiary amines, and chlorides and acetates thereof.

Cationization can be carried out by a known method. The cationizing agent may be any commonly used cationizing agent used in the cationization of polysaccharides such as starch or cellulose provided it is able to cationize such substances, and an example of a cationization method consists of treating with a glycidyl trialkyl ammonium halide or halohydrin thereof, such as glycidyl trimethyl ammonium chloride (GTA) or 3-chloro-2-hydroxypropyl trimethyl ammonium chloride (see Patent Document 3).

Cationic cellulose nanofibers may be nanofibers obtained by fibrillating cationized cellulose, and the nanofibers may be cationized during fibrillation or after fibrillation.

[Degree of Cationization (Degree of Cellulose Substitution)]

The degree of cellulose cationization can be evaluated by measuring the degree of substitution as represented by the number of cationic groups per unit glucose of cellulose. For example, the degree of cationization (degree of cellulose substitution) when glycidyl trimethyl ammonium chloride (GTA) is used as cationizing agent can be calculated using the equation below by measuring the nitrogen content of a sample by chemiluminescence.

$$\text{Degree of cationization} = (162 \times N)/(1400 - 151.6 \times N)$$

N: Nitrogen content (%)

In the cationic cellulose nanofibers of the present invention, although the degree of cationization is arbitrary provided it is within a range that does impair the effects of the present invention, it is preferably within the range of 0.01 to 0.5.

[Degree of Anionization of Anionic Additives]

An anionic additives in the present invention refers to an anionic additives that has anionic groups capable of neutralizing cationic groups and preferably has a degree of anionization of 20 mg KOH/g or more. As a result of treating cationic groups of cationic cellulose nanofibers with an anionic additives that demonstrates a degree of anionization capable of neutralizing the cationic groups within the preferable range of the present invention, the cationic cellulose nanofibers aggregate to facilitate drainage, thereby making this preferable. In addition, as a result of modifying cationic cellulose nanofibers with this anionic additives, the hydrophobicity of the cellulose nanofibers increases, and this is preferable since it is thought to facilitate uniform dispersion in a resin when re-dispersing the cellulose nanofibers in a resin after draining.

[Measurement of Degree of Anionization]

The degree of anionization of the anionic additives can be measured by various methods such as colloid measurement. In the present invention, the degree of anionization was determined using the PCD-02 Charged Particle Analyzer manufactured by Spectris Co., Ltd. The following provides a description of the measurement method.

After diluting the anionic additives to 0.02 wt % with ion exchanged water, 10 cc of the diluted anionic additives were sampled into the cell of the PCD-02 analyzer. Next, after adjusting to pH 10 with aqueous ammonia solution, the diluted anionic additives was titrated until the flow potential reached zero using an aqueous solution of $1/1000$N poly(diallyldimethylammonium chloride) (poly-DADMAC). The degree of anionization (acid value) of the anionic additives was calculated from the titrated amount of $1/1000$ mol/L poly-DADMAC solution using the equation indicated below.

$$\text{Degree of anionization(mgKOH/g)} = \text{Titrated amount of } 1/1000 \text{ mol/L poly-DADMAC solution(ml)}/2 \times 56$$

[Degree of Hydrophobicity of Anionic Additives]

In the anionic additives in the present invention, drainage rate is preferably improved by having hydrophobic sites in addition to anionic groups. In addition, when modified cellulose nanofibers in which cationic cellulose nanofibers have been neutralized with the anionic additives are re-dispersed in a resin, the demonstration of a certain degree of hydrophobicity by the anionic additives is preferable since it is typically thought to facilitate uniform dispersion in resins having higher hydrophobicity than cellulose. The degree of hydrophobicity of the anionic additives can be represented by HLB value, and the HLB value is preferably 1 to 15 and more preferably 1 to 10.

[Calculation of Degree of Hydrophobicity]

The degree of hydrophobicity (HLB value) of the anionic additives in the present invention can be calculated with the equation below using Griffin's method.

$$\text{Degree of hydrophobicity}(HLB \text{ value}) = 20 \times (\text{wt \% of hydrophilic groups})$$

A hydrophilic group in the present invention refers to a polyoxyethylene chain, polyvalent alcohol, acrylamide unit, maleic acid/fumaric acid (salt) unit, (meth)acrylic acid (salt)

unit, itaconic acid (salt) unit, vinylsulfonic acid (salt) unit, vinylphosphonic acid (salt) unit, and (meth)allylsulfonic acid (salt) unit.

[Type of Anionic Additives]

Specific examples of the anionic additives in the present invention include anionic styrene resins, anionic (meth) acrylic resins, anionic polyolefin resins, anionic polyester resins, rosins and alkenyl succinates. These anionic additives may be used alone or a plurality thereof may be used simultaneously.

The aforementioned anionic styrene resins are water-soluble or water-dispersible resins having anionic groups and a styrene backbone, examples of which include copolymers of styrenes and anionic unsaturated monomers. A portion or all of the anionic groups may be neutralized with an alkaline metal such as potassium or sodium, an alkaline earth metal or an amine compound such as ammonia, methylamine, ethylamine, dimethylamine, diethylamine, trimethylamine or triethylamine. Here, examples of styrenes include styrene, α-methylstyrene, alkyl-substituted α-methylstyrene, vinyl toluene and divinylbenzene. In addition, examples of anionic monomers include copolymers of unsaturated monocarboxylic acids, unsaturated dicarboxylic acids, unsaturated sulfonic acids and unsaturated phosphonic acids. Here, examples of unsaturated monocarboxylic acids include acrylic acid, methacrylic acid and crotonic acid, examples of unsaturated dicarboxylic acids include maleic acid, maleic anhydride, fumaric acid, itaconic acid, itaconic anhydride, citraconic acid and citraconic anhydride, examples of unsaturated sulfonic acids include vinylsulfonic acid, Styrenesulfonic acid, (meth)allylsulfonic acid and 2-acrylamido-2-methylpropanesulfonic acid, and examples of unsaturated phosphonic acids include vinylphosphonic acid and α-phenylvinylphosphonic acid. In addition, components other than the aforementioned monomers can also be used as necessary as an anionic styrene resin of the present invention.

The aforementioned anionic (meth)acrylic resins are water-soluble or water-dispersible resins having anionic groups and a (meth)acrylic backbone, and examples thereof include copolymers of alkyl (meth)acrylates and anionic unsaturated monomers. All or a portion of the anionic groups may be neutralized with an alkaline metal such as potassium or sodium, an alkaline earth metal, or an amine compound such as ammonia, methylamine, ethylamine, dimethylamine, diethylamine, trimethylamine or triethylamine. Here, examples of alkyl (meth)acrylates include methyl (meth) acrylate, ethyl (meth)acrylate, normal butyl (meth)acrylate, isobutyl (meth)acrylate, tertiary butyl (meth)acrylate, 2-ethylhexyl (meth)acrylate, stearyl (meth)acrylate and cyclic alkyl (meth)acrylate. In addition, examples of anionic monomers include copolymers of unsaturated monocarboxylic acids, unsaturated dicarboxylic acids, unsaturated sulfonic acids and unsaturated phosphonic acids. Here, examples of unsaturated monocarboxylic acids include acrylic acid, methacrylic acid and crotonic acid, examples of unsaturated dicarboxylic acids include maleic acid, maleic anhydride, fumaric acid, itaconic acid, itaconic anhydride, citraconic acid and citraconic anhydride, examples of unsaturated sulfonic acids include vinylsulfonic acid, styrenesulfonic acid, (meth)allylsulfonic acid and 2-acrylamido-2-methylpropanesulfonic acid, and examples of unsaturated phosphonic acids include vinylphosphonic acid and α-phenylvinylphosphonic acid. In addition, components other than the aforementioned monomers can also be used as necessary as an anionic (meth) acrylic resin of the present invention.

Examples of the aforementioned anionic polyolefin resins include water-soluble or water-dispersible resins having anionic groups and an olefin backbone, examples of which include those that have been dissolved in water or dispersed in water by adding a basic compound to a modified polyolefin obtained by modifying a polyolefin with an unsaturated carboxylic acid, and those that have been dissolved in water or dispersed in water by adding a basic compound to a modified polyolefin obtained by copolymerizing an olefin and unsaturated carboxylic acid.

In addition, an unsaturated monomer, that is copolymerizable with an unsaturated carboxylic acid, may also be used as necessary when modifying the polyolefin with an unsaturated carboxylic acid or when copolymerizing an olefin and an unsaturated carboxylic acid. Moreover, different types of the aforementioned polyolefins may be mixed.

Here, examples of polyolefins include copolymers of α-olefin containing at least ethylene and propylene, and examples of α-olefins include ethylene, propylene, 1-butene, 1-pentene, 1-hexene, 1-heptene, 1-octene, 1-nonene, 1-decene, 1-dodecene, 1-dodecadecene and 4-methyl-1-pentene. Examples of copolymers include random copolymers, block copolymers, graft copolymers and mixtures thereof.

Examples of unsaturated carboxylic acids include unsaturated carboxylic acids, derivatives thereof and unsaturated carboxylic acid anhydrides, while preferable examples include at least one or more types of compounds selected from the group consisting of unsaturated monobasic acids such as acrylic acid, methacrylic acid, crotonic acid and cinnamic acid; unsaturated dibasic acids such as fumaric acid, maleic acid, maleic anhydride, itaconic acid, itaconic anhydride, citraconic acid and citraconic anhydride; unsaturated dibasic acid anhydrides, hemiesters of unsaturated dibasic acids, hemiamides of unsaturated dibasic acids; unsaturated tribasic acids such as aconitic acid, 3-butene-1,2,3-tricarboxylic acid and 4-pentene-1,2,4-tricarboxylic acid, unsaturated tribasic anhydrides, mono- and diesters of unsaturated tribasic acids, mono- and diamides of unsaturated tribasic acids; unsaturated tetrabasic acids such as 1-pentene-1,1,4,4-tetracarboxylic acid, 4-pentene-1,2,3,4-tetracarboxylic acid and 3-hexene-1,1,6,6-tetracarboxylic acid; unsaturated tetrabasic acid anhydrides, mono-, di- and triesters of unsaturated tetrabasic acids and mono-, di- and triamides of unsaturated tetrabasic acids.

Examples of copolymerizable unsaturated monomers include (meth)acrylic acid alkyl esters such as methyl acrylate, methyl methacrylate, ethyl acrylate, ethyl methacrylate, n-propyl acrylate, n-propyl methacrylate, i-propyl acrylate, i-propyl methacrylate, n-butyl acrylate, n-butyl methacrylate, i-butyl acrylate, i-butyl methacrylate, 2-butyl acrylate, 2-butyl methacrylate, t-butyl acrylate, t-butyl methacrylate, cyclohexyl acrylate, cyclohexyl methacrylate, 2-ethylhexyl acrylate, 2-ethylhexyl methacrylate, n-octyl acrylate, n-octyl methacrylate, n-dodecyl acrylate, n-dodecyl methacrylate, n-octadecyl acrylate and n-octadecyl methacrylate; styrene-based monomers such as styrene, α-methylstyrene and divinylbenzene, alkadienes such as butadiene and isoprene; diisobutylene; vinyl esters such as vinyl acetate and vinyl propionate; and vinyl ethers such as isobutyl vinyl ether, dodecyl vinyl ether, cyclohexyl vinyl ether, diethylene glycol monovinyl ether and 4-hydroxybutyl vinyl ether. In addition, other examples include (meth)acrylic acid amides such as phenyl (meth)acrylate, benzyl (meth)acrylate, (meth)acrylamide, N-alkyl(meth)acrylic amide and N,N-dialkyl(meth) acrylamide; hydroxyalkyl (meth)acrylates such as hydroxyethyl (meth)acrylate and hydroxypropyl (meth)acrylate; and (meth)acrylic acid derivatives such as alkoxyalkyl (meth) acrylates, polyalkylene glycol (meth)acrylates and polyalkylene glycol (meth)acrylate alkyl ethers. These ethylenic unsaturated compounds may be used alone or two or more types may be used in combination.

Examples of basic compounds include alkaline metals such as sodium hydroxide or potassium hydroxide; alkaline earth metals such as calcium hydroxide, and amines such as ammonium, methylamine, ethylamine, propylamine, butylamine, hexylamine, octylamine, ethanolamine, isopropylamine, propanolamine, 2-methyl-2-aminopropanol, diethanolamine, N,N-dimethylethanolamine, N-methyldiethanolamine, dimethylamine, triethylamine, morpholine, N-methylmorpholine and N-ethylmorpholine, and one type or two or more types thereof can be used.

The aforementioned anionic polyester resins are water-soluble or water-dispersible resins having anionic groups and a polyester backbone, and examples thereof include resins that have been imparted with water solubility or water dispersibility by neutralizing all or a portion of the terminal carboxylic acids of a polyester obtained as an addition reaction product of a lactone compound to a hydroxycarboxylic acid, or a polyester obtained by reacting a carboxylic acid component and an alcohol component, with an alkaline metal such as potassium or sodium, an alkaline earth metal, or an amine compound such as ammonia, methylamine, ethylamine, dimethylamine, diethylamine, trimethylamine or triethylamine.

The aforementioned hydroxycarboxylic acid of a polyester obtained as an addition reaction product of a lactone compound to the hydroxycarboxylic acid is provided with hydroxyl groups and carboxyl groups, and examples thereof include glycolic acid, lactic acid, glyceric acid, hydroxybutyric acid, malic acid, tartaric acid, citric acid, ricinoleic acid and hydroxystearic acid. In addition, examples of lactone compounds include 4-methylcaprolactone, 2-methylcaprolactone, ε-caprolactone, δ-valerolactone, β-methyl-δ-valerolactone, β-propiolactone and γ-butyrolactone.

A known polyester raw material in the form of a carboxylic acid having a valence of 2 or more is mainly used for the aforementioned carboxylic acid component of the polyester obtained by reacting a carboxylic acid component and alcohol component. Examples of divalent carboxylic acids include aromatic dicarboxylic acids such as terephthalic acid, isophthalic acid and o-phthalic acid; anhydrides thereof or lower alkyl esters thereof; α,β-unsaturated dicarboxylic acids or anhydrides thereof such as maleic acid, fumaric acid, itaconic acid, mesaconic acid and citraconic acid; aliphatic dicarboxylic acids or anhydrides thereof such as malonic acid, succinic acid, glutaric acid, adipic acid, sebacic acid or azelaic acid; and succinic acid, or anhydrides thereof, substituted with an alkyl group or alkenyl group having 6 to 18 carbon atoms. In addition, examples of carboxylic acids having a valence of 3 or more include trimellitic acid, pyromellitic acid, tricarballylic acid and anhydrides thereof.

In addition, a monovalent carboxylic acid can be used for the purpose of adjusting the molecular weight or softening point of the resin as desired. Examples of monovalent carboxylic acids include natural resin acids such as the rosins to be subsequently described and modified forms thereof; aliphatic monocarboxylic acids such as octanoic acid, decanoic acid, dodecanoic acid, myristic acid, palmitic acid or stearic acid; and, aromatic monocarboxylic acids and derivatives thereof such as benzoic acid or naphthalene carboxylic acid.

In addition, a known polyester raw material in the form of an alcohol having a valence of 2 or more in the same manner as the carboxylic acid component is mainly used for the aforementioned alcohol component of the polyester obtained by reacting a carboxylic acid component and alcohol component. Examples of divalent alcohols include aliphatic or alicyclic dialcohols such as ethylene glycol, 1,2-propylene glycol, 1,3-propylene glycol, 1,4-butanediol, neopentyl alcohol, 3-methyl-1,5-pentanediol, 1,6-hexanediol, 1,8-octanediol, diethylene glycol, triethylene glycol or cyclohexane dimethanol; and, alkylene oxide addition products of bisphenol A such as polyoxypropylene(2.2)-2,2-bis(4-hydroxyphenyl)propane, polyoxypropylene(3.3)-2,2-bis(4-hydroxyphenyl)propane, polyoxypropylene(2.0)-2,2-bis(4-hydroxyphenyl)propane, polyoxypropylene(2.0)-polyoxyethylene(2.0)-2,2-bis(4-hydroxyphenyl)propane and polyoxypropylene(6)-2,2-bis(4-hydroxyphenyl)propane. In addition, examples of alcohol components having a valence of 3 or more include trimethylolethane, trimethylolpropane, glycerin, 1,2,3,6-hexanetetrol, 1,4-sorbitan, pentaerythritol, dipentaerythritol, tripentaerythritol, 1,2,4-butanetriol, 1,2,5-pentanetriol, 2-methylpropanetriol, 2-methyl-1,2,4-butanetriol and 1,3,5-trihydroxymethylbenzene. Hydroxycarboxylic acids can also be used as necessary. Specific examples include p-hydroxybenzoic acid, citric acid and gallic acid.

The aforementioned rosins are raw material rosins such as gum rosin, wood rosin or tall oil rosin, or various types of modified rosins obtained by purifying, hydrogenating, disproportionating or polymerizing raw material rosins that are made to be water-soluble or water-dispersible by neutralizing anionic groups with an alkaline metal or amine compound and the like. Examples of modified rosins include purified rosins obtained by purifying raw material rosins by distillation and the like, hydrogenated rosins obtained by hydrogenating raw material rosins, disproportionated rosins obtained by disproportionating raw material rosins, polymerized rosins obtained by polymerizing raw material rosins, unsaturated acid-modified rosins (reinforced rosins) obtained by modifying a raw material rosin or modified rosin with an unsaturated acid such as maleic acid, maleic anhydride, fumaric acid and (meth)acrylic acid, rosin phenols obtained by adding a phenol to a raw material rosin or modified rosin, rosins obtained by adding a methylolation product of a phenol to a raw material rosin or modified rosin, and rosin esters obtained by reacting a raw material rosin with an alcohol. Among these, water-soluble rosin metal salts, which are obtained by neutralizing a raw material rosin or modified rosin with an amine compound or an alkaline metal such as potassium or sodium, are preferable.

The aforementioned alkenyl succinates are those that have been imparted with water solubility or water dispersibility by neutralizing all or a portion of the carboxyl groups of alkenyl succinic acid with an alkaline metal or an amine compound such as ammonia, methylamine, ethylamine, dimethylamine, diethylamine, trimethylamine or triethylamine, or alkenyl succinate derivatives such as hemiesters or hemiamides of alkenyl succinates that have been imparted with water solubility or water dispersibility by neutralizing anionic groups with an alkaline metal or amine compound. Examples of the aforementioned alkenyl succinates include hexenyl succinate, octenyl succinate, dodecenyl succinate, hexadecenyl succinate and octadecenyl succinate.

[Neutralization with Anionic Additives]

The method used to neutralize cationic cellulose nanofibers with the anionic additives comprises adding the anionic additives to the cationic cellulose nanofibers while dispersed in an aqueous medium. All or a portion of the cationic groups of the cationic cellulose nanofibers are neutralized by the anionic additives by uniformly mixing the anionic additives using a stirring blade and the like, resulting in the obtaining of modified cellulose nanofibers that aggregate in water. When cationic groups of the cationic cellulose nanofibers are neutralized with anionic groups of the anionic additives, only a portion of the cationic groups may be neutralized or all of the cationic groups may be neutralized. In the case of neutralizing all of the cationic groups of the cationic cellulose nanofibers, the number of anionic groups of the anionic additives added may be greater than the number of cationic groups of the cationic cellulose nanofibers.

[Ratio Between Cationic Cellulose Nanofibers and Anionic Additive]

In the present invention, although there are no particular limitations on the blending ratio of the anionic additives to the cationic cellulose nanofibers provided it is within a range that allows the effects of the present invention to be obtained, the incorporated amount of anionic additives is preferably 1 part by mass to 200 parts by mass and more preferably 5 parts by mass to 100 parts by mass based on 100 parts by mass of cationic cellulose nanofibers.

[Modified Cellulose Nanofibers]

The modified cellulose nanofibers in the present invention can be obtained by neutralizing cationic groups of the aforementioned cationic cellulose nanofibers with anionic groups of the aforementioned anionic additives. As a result of cationic groups of the cationic cellulose nanofibers and anionic groups of the anionic additives becoming electrically neutral in an aqueous medium, the cationic cellulose nanofibers and anionic additives form a complex, and this becomes the modified cellulose nanofibers.

Neutralization of cationic cellulose nanofibers by the anionic additives can be confirmed by measuring the zeta potential of the aqueous medium of cationic cellulose nanofibers before and after adding the anionic additives. For example, the anionic additives is added to an aqueous medium of the cationic cellulose nanofibers and residual anionic additives is removed by suction filtration. Neutralization can then be confirmed by measuring the change in zeta potential of a dispersion obtained by re-dispersing the resulting modified cellulose nanofibers in water.

In addition, modified cellulose nanofibers can also be confirmed by detecting the compounded anionic additives.

For example, after treating modified cellulose nanofibers with dilute hydrochloric acid, the acid-treated modified cellulose nanofibers are extracted with an organic solvent, and a concentrate thereof can be subjected to various types of analyses (such as FT-IR or ionic measurement with a charged particle analyzer used to measure the degree of anionization of the anionic additives) to confirm that the modified cellulose nanofibers contain the anionic additives.

In addition, the presence of cellulose and the presence of a nitrogen source can be confirmed by analyzing the residue following extraction with organic solvent (by FT-IR or elementary analysis and the like), thereby allowing confirmation of the presence of cationic cellulose as a result thereof.

[Recovery of Modified Cellulose Nanofibers]

The method used to recover modified cellulose nanofibers obtained by neutralizing cationic cellulose nanofibers with the anionic additives may be separating solids present in an aqueous medium, and examples thereof include filtration, filter pressing and centrifugal separation.

[Incorporation of Modified Cellulose Nanofibers in Resin]

Modified cellulose nanofibers that have been recovered by draining from an aqueous medium can be preferably incorporated in a molding resin. Examples of molding resins include thermosetting resins and thermoplastic resins.

[Thermosetting Resins]

There are basically no limitations on the thermosetting resin, and a known thermosetting resin can be used.

Examples of thermosetting resins that can be used include phenolic resin, urea resin, melamine resin, unsaturated polyester resin, epoxy resin, diallyl phthalate resin, polyurethane resin, silicon resin and polyimide resin. One type of resin can be used alone or two or more types of resins can be used in combination. Phenolic resin, epoxy resin and unsaturated polyester resin are preferable.

[Thermoplastic Resins]

There are basically no limitations on the thermoplastic resin, and a known thermoplastic resin can be used. Examples include thermoplastic resins in the form of polyolefin resins such as polyethylene and polypropylene; polyester resins such as polyethylene terephthalate and polybutylene terephthalate; acrylic resins such as polymethyl methacrylate and polyethyl methacrylate; styrene resins such as polystyrene, acrylonitrile-butadiene-styrene resin, acrylonitrile-acrylic rubber-styrene resin, acrylonitrile-ethylene rubber-styrene resin, (meth)acrylic acid ester-styrene resin and styrene-butadiene-styrene resin; polyamide resins such as ionomer resin, polyacrylonitrile and Nylon; ethylene-vinyl acetate resin, ethylene-acrylic acid resin, ethylene-ethyl acrylate resin, ethylene-vinyl alcohol resin; chlorinated resins such as polyvinyl chloride and polyvinylidene chloride, fluororesins such as polyvinyl fluoride and polyvinylidene fluoride; thermoplastic resins such as polycarbonate resin, modified polyphenylene ether resin, methylpentene resin and cellulose resin; thermoplastic elastomers such as olefin-based elastomers, vinyl chloride-based elastomers, styrene-based elastomers, urethane-based elastomers, polyester-based elastomers or polyamide-based elastomers, and mixtures of two or more types thereof.

[Incorporation of Modified Cellulose Nanofibers in Molding Resin]

There are no particular limitations on the method used to incorporate modified cellulose nanofibers in a molding resin, and although a molding resin may be impregnated with a sheet or aggregate of modified cellulose nanofibers, molding resin may be added to a dispersion of modified cellulose nanofibers in an aqueous medium followed by filtration and drying, a wet cake of modified cellulose nanofibers may be incorporated in a molding resin followed by drying, or dry modified cellulose nanofibers may be added to a molding resin followed by mixing, if a method is employed in which a molding resin is added to modified cellulose nanofibers dispersed in an aqueous medium followed by draining and drying, since mixing with the resin and the drainage and drying steps can be carried out continuously, the modified cellulose nanofibers can be dispersed in the molding resin without using an organic solvent in the manner of a hydrophilic solvent such as alcohol or ether or a hydrophobic solvent such as hexane or alkyl acetate, and as a result thereof, a step such as solvent displacement is no longer necessary and the process becomes extremely simple, thereby making this particularly preferable.

The modified cellulose nanofibers are preferably kneaded with the molding resin while incorporated therein in order to facilitate dispersion of the modified cellulose nanofibers in the molding resin, and in the case of dispersing the modified cellulose nanofibers in a thermoplastic, resin, for example, a twin screw extruder, internal mixer or blender is used preferably.

[Resin Composition]

The resin composition in the present invention contains modified cellulose nanofibers, obtained by treating cationic cellulose nanofibers with an anionic additives, and a molding resin. The content of modified cellulose nanofibers in the resin composition when the amount of the molding resin is 100 parts by weight is preferably 0.5 parts by weight to 90 parts by weight, more preferably 5 parts by weight to 50 parts by weight, and even more preferably 5 parts by weight to 30 parts by weight. If the content of cellulose nanofibers is 0.5 parts by weight or less, it tends to become difficult to demonstrate the strengthening effect of the cellulose nanofibers. Although the resin composition of the present invention may be used directly in a composition or cured product, it may also be used as a master batch by diluting with other resins.

[Additives of Resin Composition]

The resin composition in the present invention may also contain various types of additives provided they are added within a range that does not impair the effects of the present invention. Examples of additives that may be incorporated include organic or inorganic fillers, pigments, thickeners, viscosity reducing agents, plasticizers, light-resistant additives (such as ultraviolet absorbers or stabilizers), antioxidants, ozonization preventive agents, activators, antistatic agents, lubricants, antifriction agents, surface modifiers (such as leveling agents, anti-foaming agents and anti-blocking agents), anti-mold agents, antimicrobials, dispersants, flame retardants, vulcanization accelerators and vulcanization assistants. One type of these additives may be used alone or two or more types may be used in combination.

[Production of Molded Body]

The resin composition of the present invention can use a known, commonly used method for molding resin compositions such as compression molding, injection molding, extrusion molding or foam molding. Molding conditions are adapted by suitably adjusting resin molding conditions as necessary.

[Applications of Molded Body]

Due to the light weight and high strength thereof, the resulting resin molded body containing modified cellulose nanofibers can be used in, for example, fields in which molded bodies of conventional microfibrillated plant fibers (cellulose nanofibers) and microfibrillated plant fiber-containing resin molded bodies are used, as well as in fields requiring higher mechanical strength (such as bending strength). For example, the resulting molded body containing modified cellulose nanofibers can be effectively used in the interior, exterior and structural members of transportation equipment such as automobiles, trains, marine vessels or aircraft, the cases, structural materials and internal components of electrical products such as personal computers, televisions or telephones, building materials, stationary materials, the cases of office equipment such as OA equipment, sports and recreational products and structural materials.

EXAMPLES

The following provides an explanation of the present invention through examples thereof. Unless specifically indicated otherwise, the terms "parts" and "%" are based on weight.

[Anionic Additives]

Anionic additives used in the present invention are indicated in the following Table 1.

TABLE 1

| Anionic additives | Type | Degree of anionization | Degree of hydrophobicity (HLB value) | Solid fraction concentration (wt %) |
|---|---|---|---|---|
| A-1 | Anionic polyolefin resin | 58 | 3.2 | 30 |
| A-2 | Anionic styrene resin | 210 | 6.6 | 15 |
| A-3 | Anionic styrene resin | 135 | 5.1 | 25 |
| A-4 | Anionic polyolefin resin | 55 | 3.6 | 30 |
| A-5 | Anionic (meth)acrylic resin | 214 | 8.7 | 25 |
| A-6 | Rosin | 34 | 7.2 | 50 |
| A-7 | Anionic polyester resin | 31 | 2 | 20 |
| A-8 | Alkenyl succinate | 32 | 7.4 | 25 |
| A-9 | Anionic (meth)acrylic resin | 61 | 15.2 | 15 |

A-1: SEIKO PMC CORP., acid-modified polyolefin emulsion, "VE-1217"
A-2: Neutralized aqueous solution of styrene-maleic anhydride copolymer (Mw: 8,500)
A-3: Neutralized aqueous solution of styrene-acrylic acid copolymer (Mw: 40,000)
A-4: SEIKO PMC CORP., acid-modified polyolefin emulsion, "ZE-1478"
A-5: Butyl methacrylate-methacrylic acid copolymer (Mw: 10,000)
A-6: SEIKO PMC CORP., neutralized reinforced rosin, "FR-1900"
A-7: Anionic polyester resin described in Synthesis Example 1 below
A-8: Alkenyl succinate described in Synthesis Example 2 below
A-9: SEIKO PMC CORP., anionic polyacrylamide resin, "DA4160"

[Calculation of Degree of Anionization]

Degree of anionization was determined using the PCD-02 Charged Particle Analyzer manufactured by Spectris Co., Ltd. The following provides a description of the measurement method.

After diluting the anionic additives to 0.02% by weight with ion exchanged water, a 10 cc aliquot thereof was sampled into the cell of the PCD-02. Next, after adjusting to pH 10 with aqueous ammonia solution, the diluted anionic additives was titrated until the flow potential reached zero using 1/1000 N aqueous poly(diallyldimethylammonium chloride) (poly-DADMAC) solution. The degree of anionization (acid value) of the anionic additives was calculated from the titrated amount of 1/1000 mol/L poly-DADMAC solution using the equation indicated below.

Degree of anionization(mgKOH/g)=Titrated amount of 1/1000 mol/L poly-DADMAC solution(ml)/2× 56

[Calculation of Degree of Hydrophobicity]

The degree of hydrophobicity of the anionic additives in the present invention was calculated with the equation below using Griffin's method.

Degree of hydrophobicity(HLB value)=20×(wt % of hydrophilic groups)

(A hydrophilic group in the present invention refers to a polyoxyethylene chain, polyvalent alcohol, acrylamide unit, maleic acid/fumaric acid (salt) unit, (meth)acrylic acid (salt) unit, itaconic acid (salt) unit, vinylsulfonic acid (salt) unit, vinylphosphonic acid (salt) unit and (meth)allylsulfonic acid (salt) unit.)

Synthesis Example 1

Synthesis of Anionic Polyester Resin-Based Anionic Additive A-7

300.5 g of 12-hydroxystearate, 114.2 g of ε-caprolactam and 0.28 g of tetrabutyl orthotitanate were placed in a 500 ml volume glass vessel equipped with a stirrer followed by heating the contents to 160° C. while stirring in the presence of flowing nitrogen. After holding the contents at a temperature of 160° C. for 3 hours, the contents were cooled to 100° C. followed by taking out the contents and further cooling to room temperature to obtain a pale yellow solid resin.

98.4 g of the aforementioned solid resin were placed in a 500 ml volume glass vessel equipped with a stirrer, followed by further adding 53.5 g of dimethylethanolamine and heating the contents to 70° C. while stirring in the presence of flowing nitrogen. After holding the contents at a temperature of 70° C. for 30 minutes, 355 g of ion exchanged water were added to obtain an aqueous dispersion of an anionic polyester resin having a concentration of 20% by weight and viscosity of 230 mPas.

Synthesis Example 2

Synthesis of Alkenyl Succinate-Based Anionic Additives A-8

106.4 g of dodecenyl succinic anhydride and 43.4 g of benzyl alcohol were added to a 1000 ml volume glass vessel equipped with a stirrer followed by adding 0.36 g of concentrated sulfuric acid and heating the contents to 70° C. while stirring. After holding the temperature of the contents at 70° C. for 2.5 hours, 42 g of 48% by weight aqueous potassium hydroxide solution, 356 g of ion exchanged water and 19.2 g of diethylene glycol dimethyl ether were added to obtain an aqueous dispersion of an alkenyl succinate having a concentration of 25% by weight viscosity of 190 mPas and pH of 10.

Production Example 1

Production of Cationic Cellulose Nanofibers 1

[Preparation of Cationized Cellulose 1]
100 g of a cellulose-containing fibrous material in the form of KC Flock W50GK (Cellulose Powder, NIPPON PAPER Chemicals Co., Ltd.), 770 g of ion exchanged water and 3387 g of isopropanol were placed in a 5 L volume glass vessel equipped with a stirrer followed by gently stirring the contents of the 5 L volume glass vessel and further adding 38.9 g of aqueous sodium hydroxide solution (concentration: 30% by weight) to the contents thereof. After stirring the contents of the 5 L volume glass vessel for 30 minutes at 30° C., the temperature was raised to 75° C. followed by the addition of 250 g of a cationizing agent in the form of an aqueous solution of glycidyl trimethyl ammonium chloride (GTA) (concentration: 80% by weight) to the contents of the 5 L volume glass vessel over the course of 15 minutes. The contents were cooled after 2 hours had elapsed since the start of addition of GTA followed by neutralizing the contents of the 5 L volume glass flask by adding 90.6 g of hydrochloric acid (concentration: 10% by weight) thereto.

After filtering the neutralized contents, the filtered product was placed in a 5 L volume glass vessel to remove residual water-soluble chemicals followed by the further addition of about 5000 g of ion exchanged water to the 5 L volume glass vessel, stirring the contents of the 5 L volume glass vessel and repeating the filtration procedure 3 times after stirring. A filtered residue was obtained from the GTA in the form of 45 g of a slurry of cationized cationic cellulose 1 (concentration: 21.4% by weight).

[Fibrillation of Cationized Cellulose 1]
7700 g of ion exchanged water were added to 300 g of the resulting slurry of the cationized cellulose 1 adjusted to a concentration of 20% by weight to prepare an aqueous suspension having a total weight of 8000 g (slurry of cationic cellulose 1 having a concentration of 0.75% by weight). The resulting slurry was subjected to mechanical fibrillation under the following conditions with a bead mill (Model: ECM-Pilot, Willie et Bakkofen Corp.) to obtain slurry of cationic cellulose nanofibers 1 (concentration: 0.75% by weight). The degree of cationization as measured under the conditions indicated below was 0.05.

<Fibrillation Conditions>
Bead type: Zircon beads (diameter: 0.5 mm)
Vessel volume: 1.5 liters
Amount of beads filled: 2470 g
Cellulose slurry flow rate: 2800 g/min
Peripheral velocity: 13 m/s
Vessel cooling water temperature: 8° C.
Treatment time: 30 minutes <Measurement of Degree of Cationization>
The degree of cationization (GTA addition rate) was calculated according to the following equation by measuring the nitrogen content of the sample by chemiluminescence using the TN-110 Total Nitrogen Analyzer manufactured by MITSUBISHI CHEMICAL ANALYTECH Co., Ltd.).

$$\text{Degree of cationization} = (162 \times N)/(1400 - 151.6 \times N)$$

N: Nitrogen content (%)

[Observation of Cationized Cellulose Nanofibers]
Approximately 10 g of the resulting slurry of the cationic cellulose nanofibers 1 were weighed out and diluted by adding 100 g of ethanol thereto followed by stirring with a magnetic stirrer for 5 minutes. The diluted slurry was centrifuged for 5 minutes at 10000 rpm and 5° C. (Himac Model CR22GII, Hitachi Koki Co., Ltd.) and the supernatant was removed by decantation. After repeating the same procedure twice, tertiary butanol was added to the residue to a total weight of 50 g followed by stirring at room temperature to obtain a homogeneous slurry which was then centrifuged. After repeating the same procedure twice, the residue subjected to solvent displacement with tertiary butanol was frozen with liquid nitrogen, and a powder of the cationic cellulose nanofibers 1 was obtained by freeze-drying (Model VD-250F, Taitec Corp.).

When the morphology of the resulting powder of the cationic cellulose nanofibers 1 was observed at a magnification of 30000× using a field emission-scanning electron microscope, cellulose nanofibers having a fiber diameter of about 10 nm were observed.

Production Example 2

Production of Untreated Cellulose Nanofibers

[Fibrillation of Untreated Cellulose]
7940 g of ion exchanged water were added to 60 g of cellulose-containing fibrous material in the form of KC Flock W50GK (Cellulose Powder, NIPPON PAPER Chemicals Co., Ltd.) to prepare an aqueous suspension having a total weight of 8000 g (cellulose slurry having a concentration of 0.75% by weight). The resulting cellulose slurry was fibrillated under the same conditions as the fibrillation conditions of the cationic cellulose described in Production Example 1 to obtain an untreated cellulose nanofiber slurry (concentration: 0.75% by weight).

[Observation of Cellulose Nanofibers]
Approximately 10 g of the resulting cellulose nanofiber slurry were weighed out and diluted by adding 100 g of ethanol thereto followed by stirring with a magnetic stirrer for 5 minutes. The diluted slurry was centrifuged for 5 minutes at 10000 rpm and 5° C. (Himac Model CR22GII, Hitachi Koki Co., Ltd.) and the supernatant was removed by decantation. After repeating the same procedure twice, tertiary butanol was added to the residue to a total weight of 50 g followed by stirring at room temperature to obtain a homogeneous slurry which was then centrifuged. After repeating the same procedure twice, the residue subjected to solvent displacement with tertiary butanol was frozen with liquid nitrogen, and a cellulose nanofiber powder was obtained by freeze-drying (Model VD-250F, Taitec Corp.).

When the morphology of the cellulose nanofiber powder was observed at a magnification of 30000× using a field emission-scanning electron microscope, cellulose nanofibers having a fiber diameter of about 10 nm were observed.

Production Example 3

Production of Cationic Cellulose Nanofibers 2

[Cationization of Cellulose Nanofibers]

2000 g of the untreated cellulose nanofiber slurry obtained in the manner described above (concentration: 0.75% by weight) were concentrated to 125 g by reduced pressure filtration and placed in a 1 L volume glass vessel equipped with a stirrer followed by the addition of 5.5 g of ion exchanged water and 508 g of isopropanol, stirring gently, and further adding 5.84 g of aqueous sodium hydroxide solution (concentration: 30% by weight).

After stirring the contents of the 1 L volume glass vessel for 30 minutes at 30° C., the temperature was raised to 75° C. followed by the further addition of 37.5 g of cationizing agent in the form of an aqueous GTA solution (concentration: 80% by weight). The contents were cooled after 2 hours had elapsed following the addition of GTA, and then 13.9 g of hydrochloric acid (concentration: 10% by weight) was added thereto, to obtain cationic cellulose nanofibers 2.

The cationic cellulose nanofibers 2 were recovered by centrifuging the aqueous slurry of the cationic cellulose nanofibers 2 (7500 rpm, 20 minutes), and 1000 g of ion exchanged water were further added to the resulting sediment followed by stirring. This procedure was repeated twice and concentration was adjusted by adding ion exchanged water to the resulting sediment following centrifugation to obtain a slurry of the cationic cellulose nanofibers 2 (concentration: 0.75% by weight).

Example 1

Production of Modified Cellulose Nanofibers and Drainage Test 37.5 g of a diluted solution (concentration: 1% by weight) of anionic additives in the form of anionic additives A-1 (SEIKO PMC CORP., "VE-1217") were added to 50 g of the slurry of the cationic cellulose nanofibers 1 obtained in Production Example 1 so that the amount of anionic additives was 10 parts by weight to 100 parts by weight of the solid fraction in the form of the cationic cellulose nanofibers; followed by stirring for 10 minutes using a magnetic stirrer and a stirring bar to form a flock of modified cellulose nanofibers, that is obtained by neutralizing the cationic cellulose nanofibers with the anionic agent; thereby obtained a slurry containing the modified cellulose nanofiber flock. The resulting slurry containing the modified cellulose nanofiber flock was subjected to reduced pressure filtration using a Nutsche filter (filtering diameter: 55 mm), filter paper (No. 2, 55 mm, Advantec Co., Ltd.), suction bottle and aspirator (WJ-20, ultimate vacuum: 23.3 hPa (20° C.), Sibata Scientific Technology, Ltd.). The amount of time until the filtrate no longer dripped down for 30 seconds was measured and this was used as the value of drainage time. The results are shown in Table 2.

Examples 2 to 38 and Comparative Examples 1 to 3

Modified cellulose nanofibers were prepared in the blending ratios shown in Table 2 using the same procedure as Example 1, and the results are shown in Table 2. However, cases in which drainage time exceeded 3600 seconds during measurement of drainage time were evaluated as "X".

TABLE 2

| | Cellulose nanofibers | | Anionic additives | | |
|---|---|---|---|---|---|
| Examples | Type | Solid fraction blending ratio (pbw) | Type | Solid fraction blending ratio (pbw) | Drainage time (sec) |
| Ex. 1 | Prod. Ex. 1 | 100 | A-1 | 10 | 385 |
| Ex. 2 | Prod. Ex. 1 | 100 | A-1 | 20 | 410 |
| Ex. 3 | Prod. Ex. 1 | 100 | A-1 | 50 | 385 |
| Ex. 4 | Prod. Ex. 1 | 100 | A-1 | 100 | 440 |
| Ex. 5 | Prod. Ex. 1 | 100 | A-2 | 3 | 605 |
| Ex. 6 | Prod. Ex. 1 | 100 | A-2 | 5 | 370 |
| Ex. 7 | Prod. Ex. 1 | 100 | A-3 | 10 | 260 |
| Ex. 8 | Prod. Ex. 1 | 100 | A-3 | 20 | 290 |
| Ex. 9 | Prod. Ex. 1 | 100 | A-3 | 50 | 440 |
| Ex. 10 | Prod. Ex. 1 | 100 | A-3 | 100 | 450 |
| Ex. 11 | Prod. Ex. 1 | 100 | A-4 | 10 | 670 |
| Ex. 12 | Prod. Ex. 1 | 100 | A-4 | 20 | 370 |
| Ex. 13 | Prod. Ex. 1 | 100 | A-4 | 50 | 350 |
| Ex. 14 | Prod. Ex. 1 | 100 | A-4 | 100 | 385 |
| Ex. 15 | Prod. Ex. 1 | 100 | A-5 | 10 | 610 |
| Ex. 16 | Prod. Ex. 1 | 100 | A-5 | 20 | 750 |
| Ex. 17 | Prod. Ex. 1 | 100 | A-5 | 50 | 865 |
| Ex. 18 | Prod. Ex. 1 | 100 | A-5 | 100 | 1295 |
| Ex. 19 | Prod. Ex. 1 | 100 | A-6 | 10 | 625 |
| Ex. 20 | Prod. Ex. 1 | 100 | A-6 | 20 | 370 |
| Ex. 21 | Prod. Ex. 1 | 100 | A-6 | 50 | 325 |
| Ex. 22 | Prod. Ex. 1 | 100 | A-6 | 100 | 380 |
| Ex. 23 | Prod. Ex. 1 | 100 | A-7 | 10 | 1155 |
| Ex. 24 | Prod. Ex. 1 | 100 | A-7 | 20 | 440 |
| Ex. 25 | Prod. Ex. 1 | 100 | A-7 | 50 | 495 |
| Ex. 26 | Prod. Ex. 1 | 100 | A-7 | 100 | 445 |
| Ex. 27 | Prod. Ex. 1 | 100 | A-8 | 10 | 1275 |
| Ex. 28 | Prod. Ex. 1 | 100 | A-8 | 20 | 630 |
| Ex. 29 | Prod. Ex. 1 | 100 | A-8 | 50 | 430 |
| Ex. 30 | Prod. Ex. 1 | 100 | A-8 | 100 | 375 |
| Ex. 31 | Prod. Ex. 1 | 100 | A-9 | 10 | 3600 |
| Ex. 32 | Prod. Ex. 1 | 100 | A-8 | 20 | 1420 |
| Ex. 33 | Prod. Ex. 1 | 100 | A-8 | 50 | 1610 |
| Ex. 34 | Prod. Ex. 1 | 100 | A-8 | 100 | 1490 |
| Ex. 35 | Prod. Ex. 3 | 100 | A-1 | 10 | 260 |
| Ex. 36 | Prod. Ex. 3 | 100 | A-1 | 20 | 182 |
| Ex. 37 | Prod. Ex. 3 | 100 | A-1 | 50 | 175 |
| Ex. 38 | Prod. Ex. 3 | 100 | A-1 | 75 | 2110 |
| Comp. Ex. 1 | Prod. Ex. 2 | 100 | A-1 | 100 | X |
| Comp. Ex. 2 | Prod. Ex. 2 | 100 | — | — | X |
| Comp. Ex. 3 | Prod. Ex. 1 | 100 | — | — | X |

Example 39

Confirmation of Neutralization by Measurement of Zeta Potential

Anionic additives in the form of anionic additives A-2 was added to the cationic cellulose nanofiber slurry obtained in Production Example 1 (concentration: 0.75% by weight) at 10% by weight based on the solid fraction of the cellulose nanofibers, and after stirring for 5 minutes at 25° C. using a magnetic stirrer and stirring bar, the zeta potential of the resulting modified cellulose nanofibers was measured using the SPZ06 Zeta Potential Analyzer (Spectris Co., Ltd.). The measured value was +18 mV. Separate from the above, the zeta potential when measured in the case of not adding anionic additives was +80 mV. Measured values of zeta potential were confirmed to fluctuate from +80 V to the negative side thereof corresponding to the addition rate of anionic additives A-2.

Example 40

Confirmation of Neutralization by Anionic Additives Using FT-IR

Anionic additives in the form of anionic additives A-2 was added to 200 g of a diluted solution of a slurry of the cationic cellulose nanofibers 1 obtained in Production Example 1 (concentration: 0.15% by weight) at 100% by weight based on the solid fraction of the cellulose nanofibers followed by stirring for 5 minutes at 25° C. using a magnetic stirrer and stirring bar to produce modified cellulose nanofibers. The resulting modified cellulose nanofibers were subjected to suction filtration using a Büchner funnel (Advantec Toyo Kaisha, Ltd., using No. 2 filter paper, filter paper diameter: 90 mm). Next, the filtration residue was transferred to a 500 ml beaker followed by the addition of aqueous hydrochloric acid solution (concentration: 1% by weight) to a total weight of 300 g, and after stirring using a magnetic stirrer and stirring bar, 100 g were sampled and subjected to suction filtration in the same manner as described above.

Moreover, the resulting filtration residue was transferred to a 300 mL volume glass vessel equipped with a stirrer, and after adding 100 g of toluene, heating and stirring for 2 hours at 90° C. and cooling, suction filtration was carried out in the same manner as described above. Toluene was distilled off from the toluene phase of the resulting filtrate, and after drying the resulting toluene extract under reduced pressure, FT-IR measurement (integration cycles: 32) was carried out on the dried toluene extract derived from the modified cellulose nanofibers using the Spectrum One Fourier Transform Infrared Spectrometer (PerkinElmer Japan Co., Ltd.).

Similarly, aqueous hydrochloric acid solution (concentration: 1% by weight) was added to a diluted solution of anionic additives A-2 (concentration: 3% by weight) until the pH lowered from 10 to 3.8, and after stirring for 5 minutes using a magnetic stirrer and stirring bar, the filtration residue was dried under reduced pressure and suction filtration was carried out in the same manner as described above followed by FT-IR measurement (integration cycles: 32) on the dried anionic additives using the Spectrum One Fourier Transform Infrared Spectrometer (PerkinElmer Japan Co., Ltd.).

When the results of IR measurement of the aforementioned toluene extract derived from the modified cellulose nanofibers were compared with the results of IR measurement of the anionic additives, a peak attributable to the anionic additives was observed in the IR chart of the toluene extract derived from the modified cellulose nanofibers, thereby confirming that the modified cellulose nanofibers were neutralized by the anionic additives.

In addition, when the filtration residue obtained following toluene extraction of the modified cellulose nanofibers was similarly measured by FT-IR, the presence of cellulose was confirmed.

Example 41

Production of Resin Composition Containing Modified Cellulose Nanofibers

After adding 6000 g of a diluted solution of anionic additives in the form of anionic additives A-1 (solid fraction:1% by weight) to 8000 g of the slurry of modified cellulose nanofibers 1 obtained in Production Example 1 (concentration:0.75% by weight) at a ratio of 5 parts by weight of the solid fraction of the anionic additives to 5 parts by weight of the solid fraction of cationic cellulose nanofibers, the resulting mixture was stirred for 10 minutes using a combination of a Polytron Homogenizer (Model PT3100, Kinematica AG) and Eurostar digital stirrer (IKA Werke GmbH & Co.) to form a flock of modified cellulose nanofibers, that is obtained by neutralizing the cationic cellulose nanofibers with the anionic additives; thereby obtained a slurry containing modified cellulose nanofibers.

1200 g of molding resin in the form of polypropylene resin powder (H-700, Prime Polymer Co., Ltd.) were added to the slurry containing a flock of the modified cellulose nanofibers at a ratio of 100 parts by weight of the molding resin to 5 parts by weight of the solid fraction of the cationic cellulose nanofibers, followed by further stirring for 10 minutes to obtain a slurry of a resin composition containing modified cellulose nanofibers.

After subjecting the aforementioned slurry of a resin composition containing modified cellulose nanofibers to reduced pressure filtration (Nylon cloth, 110 mesh) with a Nutsche filter (filtering diameter: 185 mm) and suction bottle using an aspirator (Model WJ-20, ultimate vacuum: 23.3 hPa (20° C.), Sibata Scientific Technology, Ltd.), the filtration residue was pressed to a moisture content of 40% by weight or less to obtain a wet cake of a resin composition containing modified cellulose nanofibers.

The blending ratios and results of the evaluations of physical properties indicated below are shown in Tables 3 and 4.

[Drying of Resin Composition Containing Modified Cellulose Nanofibers]

The aforementioned wet cake of a resin composition containing modified cellulose nanofibers was placed in a twin screw extruder (screw diameter: 15 mm, Technovel Corp.) followed by carrying out drying treatment. The drying conditions used by the twin screw extruder were as indicated below.

<Drying Conditions>
Screw diameter: 15 mm
Screw rotating speed: 200 rpm
L/D: 45
Discharge quantity: 300 to 400 g/hr (as solid)
Temperature settings: C1 (100° C.), C2 (100° C.), C3 (100° C.), C4 (90° C.), C5 (90° C.), C6 (90° C.)

[Uniform Dispersion of Modified Cellulose Nanofibers in Molding Resin]

The dried resin composition containing the modified cellulose nanofibers was melted and kneaded with a twin screw extruder and pelletized (size: approx. 1.5 mm×1.5 mm) using a pelletizer (Model VC, Nakatani Kikai Co., Ltd.) to obtain pellets in which were dispersed modified cellulose nanofibers. The melting and kneading conditions were as indicated below.

<Melting/Kneading Conditions>
Screw diameter: 15 mm
Screw rotating speed: 200 rpm Discharge quantity: Approx. 1000 g/hr
Temperature settings: C1-C6 (200° C.), H/D (200° C.)
[Evaluation of Dispersion]
Approximately 0.5 g of the pellets in which were dispersed modified cellulose nanofibers were weighed and molded into the shape of a film having a thickness of about 0.1 mm by placing between stainless steel plates and hot pressing (consisting of melting (200° C.)→rolling (pressure: 10 kg/cm$^2$, holding time: 30 seconds)→cooling (25° C.)) to obtain a film in which was dispersed modified cellulose nanofibers. The presence or absence of coarse aggregates of cellulose nanofibers present in the resulting film was investigated visually to evaluate the dispersibility of the modified cellulose nanofibers in the molding resin. When cases in which aggregates were not observed in the film were evaluated as "◯" and cases in which aggregates were observed were evaluated as "X"; there were no coarse aggregates observed in the film in which modified cellulose nanofibers were dispersed obtained in Example 41, and this film was evaluated as ◯.

[Production of Molded Body]
The pellets in which were dispersed modified cellulose nanofibers were placed in an injection molding machine (Minimat 14/7B, Sumitomo Heavy Industries, Ltd.) and injected into a flat metal mold having a thickness of 3 mm, width of 12.5 mm and length of 75 mm to obtain a test piece of a molded body (molding temperature: 180° C. to 185° C., metal mold temperature: 30° C.).

[Measurement of Bending Strength and Bending (Elastic) Modulus]
The bending strength (MPa) and bending (elastic) modulus (MPa) of the aforementioned test piece were measured at a testing speed of 10 mm/min and fulcrum distance of 50 mm using a Tensilon Universal Tester (Toyo Baldwin Co., Ltd., load cell: 500 kg).

[Measurement of Izod Impact Value]
A notch having a depth of 3.3 mm was made in the aforementioned test piece using a notching tool (Model A-3, V-shaped cutter blade, Toyo Seiki Kogyo Co., Ltd.). Izod impact value kJ/m$^2$, 23° C.) of the notched test piece was then measured using an Izod impact tester (1 J hammer, Toyo Seiki Kogyo Co., Ltd.).

Examples 42 to 50 and Comparative Examples 4 to 7

The procedure of Example 41 was carried out in the same manner with the exception of changing to the blending ratios shown in the following Table 3; followed by an evaluation of dispersion. Test pieces of those examples for which evaluation of dispersion was favorable were then measured for bending strength, bending elastic modulus and Izod impact value. The results are shown in Tables 3 and 4.

TABLE 3

| Examples | Cellulose nanofibers Type | Cellulose nanofibers Solid fraction blending ratio (pbw) | Anionic additives Type | Anionic additives Solid fraction blending ratio (pbw) | Molding resin Type | Molding resin Solid fraction blending ratio (pbw) | Dispersion evaluation Film dispersibility |
|---|---|---|---|---|---|---|---|
| Ex. 41 | Prod. Ex. 1 | 5 | A-1 | 5 | H-700 | 100 | ◯ |
| Ex. 42 | Prod. Ex. 1 | 10 | A-1 | 10 | H-700 | 100 | ◯ |
| Ex. 43 | Prod. Ex. 1 | 20 | A-1 | 20 | H-700 | 100 | ◯ |
| Ex. 44 | Prod. Ex. 1 | 30 | A-1 | 30 | H-700 | 100 | ◯ |
| Ex. 45 | Prod. Ex. 1 | 5 | A-3 | 5 | H-700 | 100 | ◯ |
| Ex. 46 | Prod. Ex. 1 | 5 | A-4 | 5 | H-700 | 100 | ◯ |
| Ex. 47 | Prod. Ex. 1 | 5 | A-5 | 5 | H-700 | 100 | ◯ |
| Ex. 48 | Prod. Ex. 1 | 5 | A-6 | 5 | H-700 | 100 | ◯ |
| Ex. 49 | Prod. Ex. 1 | 5 | A-7 | 5 | H-700 | 100 | ◯ |
| Ex. 50 | Prod. Ex. 1 | 5 | A-8 | 5 | H-700 | 100 | ◯ |
| Comp. Ex. 4 | Prod. Ex. 2 | 5 | — | — | H-700 | 100 | X |
| Comp. Ex. 5 | Prod. Ex. 2 | 5 | A-1 | 5 | H-700 | 100 | X |
| Comp. Ex. 6 | Prod. Ex. 1 | 5 | — | — | H-700 | 100 | X |
| Comp. Ex. 7 | — | — | — | — | H-700 | 100 | — |

TABLE 4

| | Evaluation of Cured Product | | |
|---|---|---|---|
| | Bending Strength | Bending (Elastic) Modulus | Izod Impact Value |
| Ex. 41 | 54.6 | 1968 | 2.71 |
| Ex. 42 | 54.3 | 2082 | 3.44 |
| Ex. 43 | 57.2 | 2316 | 4.41 |
| Ex. 44 | 56.1 | 2400 | 5.21 |
| Ex. 45 | 54.3 | 1779 | 2.27 |
| Ex. 46 | 54 | 1947 | 2.81 |
| Ex. 47 | 53.4 | 1949 | 2.32 |
| Ex. 48 | 52.8 | 1651 | 2.27 |
| Ex. 49 | 55 | 1932 | 2.57 |
| Ex. 50 | 51.6 | 1697 | 2.33 |
| Comp. Ex. 4 | — | — | — |
| Comp. Ex. 5 | — | — | — |
| Comp. Ex. 6 | — | — | — |
| Comp. Ex. 7 | 48.1 | 1590 | 2.18 |

Production Example 4

Production of Cationic Cellulose Nanofibers 3

[Preparation of Cationized Cellulose 2]
800 g of a cellulose-containing fibrous material in the form of LBKP (hardwood kraft pulp, concentration: 20% by weight) and 2175 g of isopropanol were placed in a 5 L volume glass vessel equipped with a stirrer followed by gently stirring the contents of the 5 L volume glass vessel and further adding 58.4 g of aqueous sodium hydroxide solution (concentration: 30% by weight) thereto. After stirring the contents of the 5 L volume glass vessel for 30 minutes at 30° C., the temperature was raised to 75° C. followed by the addition of 1875 g of a cationizing agent in the form of an aqueous solution of glycidyl trimethyl ammonium chloride (GTA) (concentration: 80% by weight) to the contents of the 5 L volume glass vessel over the course of 20 minutes. The contents were cooled after 2 hours had elapsed since the start of addition of GTA followed by adjusting the contents of the 5 L volume glass flask to pH 7 using hydrochloric acid (concentration: 10% by weight).

After filtering the neutralized contents with a 200 mesh filter cloth, the filtered product was placed in a 5 L volume glass vessel to remove residual water-soluble chemicals followed by the further addition of about 4000 g of ion exchanged water to the 5 L volume glass vessel, stirring the contents of the 5 L volume glass vessel and repeating the filtration procedure twice after stirring. 3000 g of isopropanol were further added to the filtration residue followed by stirring the contents of the 5 L volume glass vessel and filtering after stirring. The entire amount of the aforementioned filtration residue along with 2175 g of propanol were added to a 5 L volume glass vessel equipped with a stirrer followed by gently stirring the contents of the 5 L volume glass vessel and adding 58.4 g of aqueous sodium hydroxide solution (concentration: 30% by weight) thereto. After stirring the contents of the 5 L volume glass vessel for 30 minutes at 30° C., the temperature was raised to 75° C. followed by the addition of 1875 g of a cationizing agent in the form of an aqueous solution of glycidyl trimethyl ammonium chloride (GTA) (concentration: 80% by weight) to the contents of the 5 L volume glass vessel over the course of 20 minutes. The contents were cooled after 2 hours had elapsed since the start of addition of GTA followed by adjusting the contents of the 5 L volume glass flask to pH 7 using hydrochloric acid (concentration: 10% by weight).

After filtering the neutralized contents with a 200 mesh filter cloth, the filtered product was placed in a 5 L volume glass vessel to remove residual water-soluble chemicals followed by the further addition of about 4000 g of ion exchanged water to the 5 L volume glass vessel, stirring the contents of the 5 L volume glass vessel and repeating the filtration procedure three times after stirring. Concentration was then adjusted by adding ion exchanged water to the filtration residue to obtain 13 kg of a slurry of the cationic cellulose 2 (concentration: 1.0% by weight). The degree of substitution of this cationic cellulose 2 was 0.15.

[Fibrillation of Cationized Cellulose 2]

3000 g of ion exchanged water were added to 3000 g of the slurry of cationized cellulose 2 adjusted to a concentration of 1.7% by weight, followed by diluting to a concentration of 0.85% by weight. The resulting slurry was subjected to mechanical fibrillation under the following conditions with a bead mill (Model: ECM-Pilot, Willie et Bakkofen Corp.) to obtain a slurry of cationic cellulose nanofibers 3 (concentration: 0.85% by weight).

<Fibrillation Conditions>

Bead type: Zircon beads (diameter: 0.5 mm)

Vessel volume: 1.5 liters

Amount of beads filled: 2470 g

Cellulose slurry flow rate: 700 g/min

Peripheral velocity: 13 m/s

Vessel cooling water temperature: 8° C.

No. of treatment paths: 2

Example 51

Production of Resin Composition Containing Modified Cellulose Nanofibers

After adding 4500 g of a diluted solution of anionic additives in the form of anionic additives A-1 (solid fraction: 1% by weight) to 1765 g of the slurry of modified cellulose nanofibers 3 obtained in Production Example 3 (concentration:0.85% by weight) at a ratio of 15 parts by weight of the solid fraction of the anionic additives to 5 parts by weight of the solid fraction of cationic cellulose nanofibers, the resulting mixture was stirred for 10 minutes using a combination of a Polytron Homogenizer (Model PT3100, Kinematica AG) and Eurostar digital stirrer (IKA Werke GmbH & Co.) to form a flock of modified cellulose nanofibers, that is obtained by neutralizing highly substituted cationic cellulose nanofibers with the anionic additives; thereby obtained a slurry containing modified cellulose nanofibers.

300 g of molding resin in the form of polypropylene resin powder (H-700, Prime Polymer Co., Ltd.) were added to the slurry containing a flock of the modified cellulose nanofibers at a ratio of 100 parts by weight of the molding resin to 5 parts by weight of the solid fraction of the cationic cellulose nanofibers, followed by further stirring for 10 minutes to, obtain a slurry of a resin composition containing modified cellulose nanofibers.

After subjecting the aforementioned slurry of a resin composition containing modified cellulose nanofibers to reduced pressure filtration (Nylon cloth, 110 mesh) with a Nutsche filter (filtering diameter: 185 mm) and suction bottle using an aspirator (Model WJ-20, ultimate vacuum: 23.3 hPa (20° C.), Sibata Scientific Technology, Ltd.), the filtration residue was pressed to a moisture content of 40% by weight or less to obtain a wet cake of a resin composition containing modified cellulose nanofibers.

[Drying of Resin Composition Containing Modified Cellulose Nanofibers]

The aforementioned wet cake of a resin composition containing modified cellulose nanofibers was placed in a twin screw extruder (screw diameter: 15 mm, Technovel Corp.) followed by carrying out drying treatment. The drying conditions used by the twin screw extruder were as indicated below.

<Drying Conditions>

Screw diameter: 15 mm

Screw rotating speed: 200 rpm

L/D: 45

Discharge quantity: 300 to 400 g/hr (as solid)

Temperature settings: C1 (100° C.), C2 (100° C.), C3 (100° C.), C4 (90° C.), C5 (90° C.), C6 (90° C.)

[Uniform Dispersion of Modified Cellulose Nanofibers in Molding Resin]

The dried resin composition containing the modified cellulose nanofibers was melted and kneaded with a twin screw extruder and pelletized (size: approx. 1.5 mm×1.5 mm) using a pelletizer (Model VC, Nakatani Kikai Co., Ltd.) to obtain pellets in which were dispersed modified cellulose nanofibers. The melting and kneading conditions were as indicated below.

<Melting/Kneading Conditions>
Screw diameter: 15 mm
Screw rotating speed: 200 rpm
Discharge quantity: Approx. 1000 g/hr
Temperature settings: C1-C6 (200° C.), H/D (200° C.)

When the resulting pellets in which were dispersed modified cellulose nanofibers were measured for film dispersibility and Izod impact value (kJ/m$^2$) in the same manner as Example 41, film dispersibility was evaluated as ○ and Izod impact value was 3.73 kJ/m$^2$.

Example 52

Measurement of Total Light Transmittance of Film Containing Modified Cellulose Nanofibers Total light transmittance was measured for the film in which modified cellulose nanofibers were dispersed that was evaluated for dispersibility in Example 41 (NHD2000 Turbidity Meter, measurement method 3, light source: D65, Nippon Denshoku Industries Co., Ltd.). Measurements were made at 4 locations in the film, and when the average value thereof was used as the measured value, total light transmittance was determined to be 90.8 (t=0.1 mm).

Examples 53 to 62 and Comparative Examples 8 to 11

Total light transmittance was measured for the films fabricated in Examples 42 to 51 and Comparative Examples 4 to 7 in the same manner as Example 52, and the respective results are shown in Table 5. In Comparative Examples 8 to 10, since the cellulose nanofibers aggregated in the film, there were considerable variations in the values of total light transmittance for each measured location, and it was not possible to calculate average values.

containing the modified cellulose nanofibers has high mechanical strength, it can be used in, for example, fields in which molded bodies of conventional microfibrillated plant fibers (cellulose nanofibers) and microfibrillated plant fiber-containing resin molded bodies are used, as well as in fields requiring higher mechanical strength (such as bending strength). For example, a molding resin composition or molded body containing the modified cellulose nanofibers can be effectively used in the interior, exterior and structural members of transportation equipment such as automobiles, trains, marine vessels or aircraft, the cases, structural materials and internal components of electrical products such as personal computers, televisions or telephones, building materials, stationary materials, the cases of office equipment such as OA equipment, sports and recreational products and structural materials.

The invention claimed is:

1. Modified cellulose nanofibers obtained by neutralizing cationic groups of cationic cellulose nanofibers having a degree of cationization of 0.01 to 0.5 with an anionic additive, wherein the ratio of the cationic cellulose nanofibers to the anionic additive is from 0.5 to 100.

2. The modified cellulose nanofibers according to claim 1, wherein the degree of anionization of the anionic additive is at least 20 mgKOH/g.

3. The modified cellulose nanofibers according to claim 2, wherein the degree of hydrophobicity (HLB value) of the anionic additive is 1 to 15.

4. The modified cellulose nanofibers according to claim 1, wherein the anionic additive is selected from an anionic styrene resin, an anionic (meth)acrylic resin, an anionic polyolefin resin, an anionic polyester resin, a rosin, or an alkenyl succinate, or a plurality thereof.

TABLE 5

| Examples | Film | Cellulose nanofibers Production example | Cellulose nanofibers Solid fraction blending ratio (pbw) | Anionic additives Type | Anionic additives Solid fraction blending ratio (pbw) | Optical properties Total light transmittance t = 0.1 mm |
|---|---|---|---|---|---|---|
| Ex. 52 | Ex. 41 | Prod. Ex. 1 | 5 | A-1 | 5 | 90.8 |
| Ex. 53 | Ex. 42 | Prod. Ex. 1 | 10 | A-1 | 10 | 90.5 |
| Ex. 54 | Ex. 43 | Prod. Ex. 1 | 20 | A-1 | 20 | 87.1 |
| Ex. 55 | Ex. 44 | Prod. Ex. 1 | 30 | A-1 | 30 | 86.9 |
| Ex. 56 | Ex. 45 | Prod. Ex. 1 | 5 | A-3 | 5 | 90.5 |
| Ex. 57 | Ex. 46 | Prod. Ex. 1 | 5 | A-4 | 5 | 89.2 |
| Ex. 58 | Ex. 47 | Prod. Ex. 1 | 5 | A-5 | 5 | 90.2 |
| Ex. 59 | Ex. 48 | Prod. Ex. 1 | 5 | A-6 | 5 | 88.2 |
| Ex. 60 | Ex. 49 | Prod. Ex. 1 | 5 | A-7 | 5 | 88.3 |
| Ex. 61 | Ex. 50 | Prod. Ex. 1 | 5 | A-8 | 5 | 89.5 |
| Ex. 62 | Ex. 51 | Prod. Ex. 2 | 6 | A-9 | 6 | 90.6 |
| Comp. Ex. 8 | Comp. Ex. 4 | Prod. Ex. 2 | 5 | — | — | X |
| Comp. Ex. 9 | Comp. Ex. 5 | Prod. Ex. 2 | 5 | A-1 | 5 | X |
| Comp. Ex. 10 | Comp. Ex. 6 | Prod. Ex. 1 | 5 | — | — | X |
| Comp. Ex. 11 | Comp. Ex. 7 | — | — | — | — | 92.0 |

INDUSTRIAL APPLICABILITY

The modified cellulose nanofibers of the present invention can be preferably used as a reinforcing agent of molding resins. Since a molding resin composition or molded body 5. The modified cellulose nanofibers according to claim 1, wherein the nanofibers have a diameter in the range of 4 nm to 800 nm.

* * * * *